United States Patent [19]

Tolhurst et al.

[11] Patent Number: 4,542,049
[45] Date of Patent: Sep. 17, 1985

[54] FLEXIBILIZED POLYURETHANE PIPE COATING

[75] Inventors: Gary A. Tolhurst, Worthington; Albert L. Haugse, Columbus, both of Ohio

[73] Assignee: Ashland Oil, Inc., Ashland, Ky.

[21] Appl. No.: 645,026

[22] Filed: Aug. 28, 1984

[51] Int. Cl.$^4$ ............................................. C08G 18/38
[52] U.S. Cl. ............................ 427/388.1; 427/388.2; 528/77; 528/78
[58] Field of Search ................. 528/77, 78; 427/388.1, 427/388.2

[56] References Cited

U.S. PATENT DOCUMENTS

| | | | |
|---|---|---|---|
| 3,112,281 | 11/1963 | Gromacki et al. | 528/78 |
| 3,255,253 | 7/1966 | Kuryla | 528/78 |
| 3,346,517 | 10/1967 | Kamal | 528/78 |
| 3,423,344 | 1/1969 | Odinak et al. | 528/78 |
| 3,640,997 | 2/1972 | Fijal | 528/78 |

Primary Examiner—Maurice J. Welsh
Attorney, Agent, or Firm—Mueller and Smith

[57] ABSTRACT

Disclosed is a coating composition suitable for coating metal pipe, especially the interior of pipe. The coating composition comprises a blend of one or more polyether polyols and a flexibilizing stearically hindered amine-initiated polyether polyol and a multi-isocyanate curing agent. The curing composition optionally may contain an organic solvent and inert particulate filler. The coating composition cures within about 1 to 3 minutes after application and preferably is spray applied. The coating composition possesses adequate flexibility to pass a 15% ring deflection test.

5 Claims, No Drawings

FLEXIBILIZED POLYURETHANE PIPE COATING

BACKGROUND OF THE INVENTION

The present invention relates to room-temperature curable coatings and more particularly to such a coating which has been adapted for application to the interior or exterior of pipe.

Cast iron or other metal pipe is lined or coated conventionally for conveying sewage, water, or other material. Such pipe lining is needed in order to protect the pipe against corrosion from moderately acidic or basic sewage or from oxidation by potable or ground water. Accordingly, a suitable pipe lining must possess several unique characteristics in order to find success in the marketplace. Such characteristics include: (1) the cured film must not crack or separate from the pipe when subjected to a 15% ring deflection (i.e. deflection of pipe by 15% of its cross-sectional diameter); (2) the coating composition may not contain any acid radicals or chloride groups; (3) the coating must be UV resistant; (4) the coating composition must be compatible with neutral inorganic fillers; (5) the cured film must be tough, flexible, and non-porous; (6) the coating composition should cure within three minutes maximum and preferably within one minute; (7) the coating composition should be composed of no more than two liquid components; (8) the cured film must be resistant to moderate acidity or basicity; and (9) the cured film must withstand temperatures ranging from about $-20°$ to about $80°$ C.

Heretofore, cement has been used as a pipe lining, but cement often is slow curing, inflexible, porous, and prone to degradation in acidic and basic environments. Coal tar epoxies or polyethylene beads also have been used, but such materials are thermoplastic and require the pipe to be heated to about $370°$ C. to melt these materials and cause them to flow and evenly coat the pipe. Such heating step is energy intensive and less productive due to the relatively long heating and cooling cycles required.

BROAD STATEMENT OF THE INVENTION

The present invention is directed to a coating composition which is suitable for application to metal pipe. Such coating composition comprises a blend of one or more polyether polyols and a flexibilizing sterically hindered amine-initiated polyether polyol, preferably containing a long polyoxyalkylene flexure group; a multi-isocyanate curing agent, optionally, an organic solvent; and optionally, an inert particulate filler. The coating composition does not separate from the metal pipe to which it is applied when subjected to a 15% ring deflection and cures within about one to three minutes after application.

Advantages of the present invention include a coating composition which cures rapidly at ambient temperature. Another advantage is a coating which is sufficiently flexible to pass a 15% ring deflection test. These and other advantages will be readily apparent to those skilled in the art based upon the disclosure contained herein.

DETAILED DESCRIPTION OF THE INVENTION

The polyol phase of the coating composition is a blend of one or more polyether polyols (preferably tetrafunctional) and a flexibilizing stearically hindered amine-initiated polyether polyol. A variety of polyether polyols may be suitable for use in the blend of the coating composition. Such polyether polyols may be simple alkoxylated (eg. ethoxylated or propoxylated) derivatives of aliphatic or aromatic alcohols or may be more complex in resin backbone structure, depending upon the precise environment intended for the coating composition. While the polyether polyols may be aliphatic, such polyols additionally may contain an amine or imine group for providing a self-catalyzed polyether polyol. The polyether polyols additionally may be synthesized from ingredients which include carboxyl groups, aldehyde groups, and the like. For example, the polyether polyol may be a phenol-aldehyde reaction product, such as described in U.S. Pat. No. 3,485,797. Surprisingly, work on the present invention revealed that urethane foam-grade polyether polyols functioned ideally in the pipe coating composition of the present invention.

Another discovery uncovered during the course of research on the present invention was the need for the addition of a flexibilizing additive to the blend of the coating composition in order to meet the 15% ring deflection test required of commercial-grade pipe coatings. The flexibilizing additive determined to function in the coating composition of the present invention is a sterically hindered amine-initiated polyether polyol. The preferred flexibilizing additive is an aromatic amine-initiated propylene oxide/ethylene oxide copolymer. While such additive provides the requisite degree of flexibility required of the coating composition, the precise reasons therefor are not yet fully verified. Possible reasons include the additive's ability to enhance solubility of the solvent in the cured film, eg. a plasticizing effect; the longer chain length of the additive providing flexure of the film; or both effects. The proportion of flexibilizing additive in the polyol phase of the coating composition should be adequate to impart the requisite degree of flexibility to the coating composition. Such adequate proportion can range from as low as about 8% or less to as high as about 24% or greater, with the balance being other polyether polyols.

Multi-isocyanate cross-linking agents cross-link with the hydroxyl groups in the polyether polyol blend under the influence of an amine or other catalyst to form urethane linkages and to cure the coating. Of course, polymeric isocyanates advantageously are employed in order to reduce toxic vapors of isocyanate monomers. Further, alcohol-modified and other modified isocyanate compsitions find utility in the invention. Multi-isocyanates preferably will have from about 2-4 isocyanate groups per molecule for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane, triisocyanate, tris-(4-isocyanatophenyl)thiophosphate, cyclohexane diisocyanate (CHDI), bis-(isocyanatomethyl)cyclohexane ($H_6$XDI), dicyclohexylmethane diisocyanate ($H_{12}$MDI), trimethylhexane diisocyanate, dimer acid diisocyanate (DDI), dicyclohexylmethane diisocyanate and dimethyl derivatives thereof, trimethyl hexamethylene diisocyanate, lysine diisocyanate and its methyl ester, isophorone diisocyanate, methyl cyclohexane, diisocyanate, 1,5-napthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The ratio of hydroxyl equivalents from the polyether polyol blend to the isocyanate equivalents of the multi-isocyanate cross-linking agent should preferable be about 1:1, though such ratio can range from as low as about 0.8:1 to about 1:2. The precise intended application of the coating composition often will dictate this ratio or isocyanate index.

Since the preferred application technique is spray application, often a solvent or vehicle for the coating composition will be required. Such solvent or vehicle is a volatile organic solvent or solvent mixture. Aromatic solvents may be necessary and typically are a part of the volatiles in commercial isocyanate polymers. Non-aromatic solvents include, for example, methyl ethyl ketone, acetone, methyl isobutyl ketone, ethylene glycol monoethyl ether acetate, and the like. Aromatic solvents include, for example, toluene, xylene, and the like. The proportion of volatile organic solvent should be restricted to that minimum required to impart the desired application viscosity to the coating composition.

As noted above, the polyether polyols may contain nitrogen atoms for providing a self-catalyzed system. When additional catalyst is required or when no self-catalyzed polyether polyols are used, a catalyst is included in the formulation. Suitable catalysts include amine catalysts, for example tertiary amines containing substituents such as alkyl, alkanol, aryl, cycloaliphatic, and mixtures thereof. Additionally, heterocyclic tertiary amines may be suitable for use in the invention also. Representative tertiary amines include, for example, triethyl amine, dimethyl ethyl amine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, isoquinoline, n-ethyl morpholine, triethylene diamine, and the like and mixtures thereof. Alternatively, or additionally, metal catalysts (eg. dibutyl tin dilaurate, stannous octoate, or the like) may be used in the coating composition of the present invention. The proportion of catalyst is an effective catalytic amount and such proportion will depend upon the ingredients used in formulating the coating composition.

The coating composition additionally may contain inert particulate fillers conventionally used in pipe lining formulations. The coating composition is provided as a two-pack formulation. One pack comprises the polyether polyol blend while the second pack comprises the curing agent. It is believed that the most effective way of providing the coating composition for application involves the metering of each package of the coating composition to a static in-line mixer which would provide a homogenous mixture of the two packages. From the static in-line mixer, the coating composition can be fed to a spray gun for application of the coating composition onto the pipe. Spray application is believed to be the preferred method for applying the pipe lining, especially to the interior of a metal pipe. Suitable spray techniques include mechanical generation of atomized coating composition accomplished by the use of a conventional spinning disk, spinning bell, or other form of mechanical atomizer. Alternatively, gas or air atomization utilizing conventional air spray guns may be utilized for applications of the coating composition. It is to be noted that the pipe optionally may be rotated in order to ensure the uniform application of the coating onto the interior thereof.

The following example shows how the present invention has been practiced, but should not be construed as limiting. In this application, all percentages and proportions are by weight, unless otherwise expressly indicated.

EXAMPLE

The following polyether polyols, isocyanate, and solvent were used in formulating several different pipe coatings for evaluations.

Quadrol: N,N,N′,N′-tetrakis(2-hydroxypropyl)ethylene diamine, hydroxyl no. 770, molecular weight 292, BASF Wyandotte Corporation, Parsippany, N.J.

V-800: Voranol 800 polyol is an amine-based polyether polyol designed for foam production, hydroxyl no. 800, viscosity 17,300 cks (25° C.), density 8.754 lbs/gal (25° C.), specific gravity, 1.052 (25° C./25° C.), Dow Chemical Company, Midland, Mich.

V-490: Voranol 490 polyol is a medium functional, sucrose-based polyether polyol designed for the production of rigid urethane foams, hydroxyl no. 490, viscosity 5,500 cks (25° C.), density 9.26 lbs/gal (25° C., specific gravity 1.11 (25° C./25° C.), Dow Chemical Company.

XAS: XAS 10797 polyol is an aromatic amine initiated tetrafunctional polyoxypropylene-oxyethylene polymer, hydroxyl no. 350, 50% primary hydroxyl groups, hydroxyl percent 10.6, viscosity 5,200 cks (15° C0, Gardner color 12 max., specific gravity 1.088 (25° C./25° C.), density 9.08 lbs/gal. (25° C.), Dow Chemical Company.

Mondur MR: Modur MR curing agent is a polymeric diphenylmethane diisocyanate of Mobay Chemical Corporation, Pittsburgh, Pa.

HS-10: HiSol 10 solvent is a blend of aromatic hydrocarbons, essentially $C_8$ and $C_9$ groups, having a boiling point range of 157.22° C. to 176.67° C., API gravity 2.80 min–3.20 max (15.55° C.), 95 vol-% aromatics (minimum), KB value 90 min, Aniline Point Max (mixed °C.), Color Saybolt 21 min, Ashland Chemical Company, Dublin, Ohio.

The pipe coating formulations ideally should cure in 60 seconds and possess adequate flexibility to withstand a 15% deflection of the pipe. The following results were obtained.

| Ingredient | | Polyol Phase (wt %) | Polyol Phase (wt %) | Mondur MR (wt %) | Cure Time (sec) | Flexibility |
| --- | --- | --- | --- | --- | --- | --- |
| A. | V-800 | 56 | 43 | 57 | 26 | O.K. |
| | XAS | 24 | | | | |
| | HS-10 | 20 | | | | |
| B. | V-490 | 56 | 53 | 47 | 20 | O.K. |
| | XAS | 24 | | | | |
| | HS-10 | 20 | | | | |
| C. | Quadrol | 56 | 44 | 56 | 40 | Fair |

| Ingredient | | Polyol Phase (wt %) | Polyol Phase (wt %) | Mondur MR (wt %) | Cure Time (sec) | Flexibility |
|---|---|---|---|---|---|---|
| | XAS | 24 | | | | |
| | HS-10 | 20 | | | | |
| D. | Quadrol | 80 | 34 | 66 | 40 | Poor |
| | HS-10 | 20 | | | | |
| E. | V-800 | 40 | 44 | 56 | 50 | Poor |
| | V-490 | 40 | | | | |
| | HS-10 | 20 | | | | |
| F. | V-800 | 32 | 46 | 54 | 70 | Excellent |
| | V-490 | 32 | | | | |
| | XAS | 16 | | | | |
| | HS-10 | 20 | | | | |
| G. | V-800 | 36 | 45 | 55 | 55 | O.K. |
| | V-490 | 36 | | | | |
| | XAS | 8 | | | | |
| | HS-10 | 20 | | | | |

Flexibility was judged by filling a thin, clear plastic tube with the coating and flexing the filled tube. It will be seen that cure speed can be varied by a wide margin by selection of polyol ingredients. Flexibility, on the other hand, only was acceptable in formulations containing the XAS polyol. Such polyol appears to function as a flexibilizing additive in the formulation.

We claim:

1. A method for coating a metal pipe with a flexible coating composition which comprises:
applying to said metal pipe a coating composition which comprises (a) a blend of between about 76 and 92 weight percent of one or more polyether polyols and between about 24 and 8 weight percent of a flexibilizing sterically-hindered amine-initiated polyether polyol and (b) a multi-isocyanate curing agent, said coating composition curing within about 1 to 3 minutes after its application and the cured film of said coating composition passing a 15 percent ring deflection test on said metal pipe.

2. The method of claim 1 wherein said flexibilizing polyether polyol comprises an aromatic amine-initiated propylene oxide/ethylene oxide copolymer.

3. The method of claim 1 wherein said composition additionally contains ingredients selected from an organic solvent, an inert particulate filler, or both.

4. The method of claim 1 wherein said coating composition additionally contains an amine catalyst for curing within said 1 to 3 minutes.

5. The method of claim 1 wherein said polyether polyols of said blend are tetrafunctional and contain amine groups.

* * * * *